3,080,288
ORAL COMPOSITIONS AND METHOD FOR INCREASING TETRACYCLINE ANTIBIOTIC ABSORPTION WITH TARTRONIC ACID
George Tonelli, Emerson, and James M. Smith, Jr., Ridgewood, N.J., assignors to American Cyanamid Company, New York, N.Y., a corporation of Maine
No Drawing. Filed July 12, 1960, Ser. No. 42,243
13 Claims. (Cl. 167—65)

This invention relates to novel antibiotic compositions and more particularly is concerned with the preparation of novel antibiotic compositions containing a tetracycline antibiotic and a potentiating agent whereby effective blood levels of the antibiotic are obtained more rapidly, reach a higher level and are maintained over a longer period of time than would be expected following oral administration of a tetracycline antibiotic without the potentiating agent.

The use of potentiating agents or adjuvants for the purpose of enhancing the blood levels of orally administered tetracycline antibiotics has come into widespread use in recent years. Citric acid has proven to be one of the best adjuvants for increasing the rate of absorption and for enhancing serum levels of orally administered tetracycline.

In accordance with the present invention we have now discovered that tartronic acid (hydroxymalonic acid) is superior to the known adjuvants, such as citric acid, for increasing the blood levels in terms of tetracycline equivalents.

The tetracycline antibiotics which may be administered orally in admixture with tartronic acid include the known biologically active tetracyclines, among which may be mentioned tetracycline, chlortetracycline, oxytetracycline, demethylchlortetracycline, demethyltetracycline, 6-deoxytetracycline, 6-demethyl-6-deoxytetracycline, 7-bromo-6-demethyl-6-deoxytetracycline, 7-chloro-6-demethyl-6-deoxytetracycline, 7-iodo-6-demethyl-6-deoxytetracycline, 7-nitro-6-demethyl-6-deoxytetracycline, 9-nitro-6-demethyl-6-deoxytetracycline, 7-bromo-6-deoxytetracycline, 7-iodo-6-deoxytetracycline, 9-nitro-6-deoxytetracycline, 7-nitro-6-deoxytetracycline, 7-amino-6-demethyl-6-deoxytetracycline, 9-amino-6-demethyl-6-deoxytetracycline, 9-amino-6-deoxytetracycline, 9-amino-7-bromo-6-deoxytetracycline, 9-amino-7-nitro-6-deoxytetracycline, 7-iodo-5-hydroxy-6-deoxytetracycline, 7-bromo-5-hydroxy-6-deoxytetracycline, 5-hydroxy-6-deoxytetracycline, 9-amino-7-bromo-6-demethyl-6-deoxy-tetracycline, 7-bromo-9-nitro-6-demethyl-6-deoxytetracycline, 9-amino-7-chloro-6-demethyl-6-deoxytetracycline, 7-chloro-9-nitro-6-demethyl-6-deoxytetracycline, etc.

The tetracyclines may be used in the form of their free bases or in the more preferred form of administration as a salt thereof, particularly the hydrochloride salt.

The proportion of the tetracycline antibiotic to tartronic acid may vary over a fairly wide range. The adjuvant is preferably used in an amount ranging from about 1 to 3 parts by weight of the tetracycline antibiotic. As the adjuvant is much cheaper than the tetracycline antibiotic it is preferred to operate with an excess of adjuvant and optimum results will usually be obtained with an amount of adjuvant ranging from equal amounts to three times the weight of the tetracycline antibiotic.

A dosage unit form of the new compositions of this invention is most conveniently a powdered mixture of the antibiotic and the tartronic acid enclosed in a gelatin capsule. The dosage unit form may contain from about 25 to 500 mg. of one of the desired tetracyclines with from 1 to 3 parts by weight of tartronic acid. An inert diluent such as starch, sucrose, and magnesium stearate may be added if desired. A preferred composition consists of 250 mg. of a tetracycline antibiotic free base together with 500 to 750 mg. of tartronic acid in a soft gelatin capsule. If desired, the composition may be granulated and administered as such, or may be compressed into tablets suitable for oral administration. Also, if desired, a composition can be formulated into numerous pharmaceutical substances such as pediatric drops, elixirs, and various other conventional pharmaceutical forms of medication. These will be administered by the attending physician or veterinarian in accordance with the age and condition of the patient, nature of the disease and in view of the other considerations peculiar to the individual patient.

While the principal utility of the compositions of this invention is expected to be as an orally administered tetracycline antibiotic composition for use in human therapy, it is also within the scope of the present invention to provide suspensions or dispersions of the tetracycline antibiotic compositions for use in the treatment of animals in which case aqueous solutions may be employed for intravenous administration or solutions or suspensions with organic solvents may be prepared for intramuscular administration.

The invention will be described in greater detail in conjunction with the following specific examples.

EXAMPLE 1

Group of the same number of albino rats ranging in weight from 175 to 300 grams were dosed with a solution or suspension of 50 mg./kg. of tetracycline hydrochloride via feeding needle. A similar group received a mixture of 50 mg./kg. of tetracycline hydrochloride plus 140 mg./kg. of citric acid. A similar group received 50 mg./kg. of tetracycline hydrochloride plus 140 mg./kg. of tartronic acid. The blood levels were determined at two and four hours. The results obtained are shown in the table below:

Table 1

| Substance | Oral Dose, mg./kg. | Average (5 rats) Blood Levels (mcg./ml.) | |
|---|---|---|---|
| | | 2 hrs. | 4 hrs. |
| Tetracycline HCl | 50 | 5.69 | 3.36 |
| Tetracycline HCl plus Citric ac'd | 50 140 | 9.02 | 5.42 |
| Tetracycline HCl plus Tartronic acid | 50 140 | 13.36 | 9.15 |

It will be noted that tartronic acid gives much greater blood levels than does nitric acid and more than twice the blood levels obtained by the control.

EXAMPLE 2

The procedure of Example 1 was repeated with a new group of rats. The results obtained are shown in the following table.

Table 2

| Substance | Oral Dose | Average (10 rats) Blood Levels (mcg./ml.) | |
|---|---|---|---|
| | | 2 hrs. | 4 hrs. |
| Tetracycline HCl | 50 mg./kg. | 5.96 | 4.18 |
| Tetracycline HCl plus citric acid | 50 mg./kg. of each. | 6.29 | 4.37 |
| Tetracycline HCl plus tartronic acid | 50 mg./kg. of each. | 8.00 | 4.94 |

It will be noted that tartronic acid at 50 mg./kg. gives greater blood levels than does citric acid and about one and one-half times the blood levels obtained by the control.

EXAMPLE 3

The procedure of Example 1 was repeated with a new group of rats using demethyltetracycline in place of tetracycline. The results obtained are shown in the following table.

*Table 3*

| Substance | Oral Dose, mg./kg. | Average (3 rats) Blood Levels (mcg./ml.) | |
|---|---|---|---|
| | | 2 hrs. | 4 hrs. |
| Demethyltetracycline HCl | 50 | 4.5 | 2.56 |
| Demethyltetracycline HCl plus Citric acid | 50 140 | 5.69 | 5.14 |
| Demethyltetracycline HCl plus Tartronic acid | 50 140 | 12.25 | 9.60 |

EXAMPLE 4

The procedure of Example 1 was repeated with a new group of rats using demethylchlortetracycline in place of tetracycline. The results obtained are shown in the following table.

*Table 4*

| Substance | Oral Dose, mg./kg. | Average (3 rats) Blood Levels (mcg./ml.) | |
|---|---|---|---|
| | | 2 hrs. | 4 hrs. |
| Demethylchlortetracycline HCl | 50 | 2.8 | 2.4 |
| Demethylchlortetracycline HCl plus Citric acid | 50 140 | 5.8 | 4.3 |
| Demethylchlortetracycline HCl plus Tartronic acid | 50 140 | 7.91 | 7.13 |

We claim:
1. A composition of matter comprising a tetracycline antibiotic and from 1 to 3 parts by weight of tartronic acid as an oral potentiating agent therefor.
2. A composition according to claim 1 in which the antibiotic is chlortetracycline.
3. A composition according to claim 1 in which the antibiotic is tetracycline.
4. A composition according to claim 1 in which the antibiotic is oxytetracycline.
5. A composition according to claim 1 in which the antibiotic is demethylchlortetracycline.
6. A composition according to claim 1 in which the antibiotic is demethyltetracycline.
7. A method of increasing the absorption of a tetracycline antibiotic when administered orally which comprises the step of administering therewith from 1 to 3 parts by weight of tartronic acid.
8. A method according to claim 7 in which the antibiotic is chlortetracycline.
9. A method according to claim 7 in which the antibiotic is tetracycline.
10. A method according to claim 7 in which the antibiotic is oxytetracycline.
11. A method according to claim 7 in which the antibiotic is demethylchlortetracycline.
12. A method according to claim 7 in which the antibiotic is demethyltetracycline.
13. An article of manufacture in dosage unit form suitable for oral administration comprising a mixture of from 25 to 500 milligrams of a tetracycline antibiotic and from 1 to 3 parts of tartronic acid.

References Cited in the file of this patent

Boger et al.: "An Evaluation of Tetracycline Preparations," The New England Journal of Medicine, vol. 261, No. 17, Oct. 22, 1959, pp. 827–832.

Eisner et al.: "The Enhancement of Serum Levels of Aureomycin in Experimental Animals," Journal of Pharmacology and Experimental Therapeutics, vol. 108, pp. 442–449 (1953).